United States Patent [19]

Kempter et al.

[11] Patent Number: 5,527,859
[45] Date of Patent: Jun. 18, 1996

[54] PREPARATION OF COPOLYMERS CROSSLINKABLE BY A FREE RADICAL METHOD

[75] Inventors: Fritz E. Kempter, Mannheim; Wolfgang Reich, Rodach; Jürgen Hofmann, Ludwigshafen, all of Germany

[73] Assignee: BASF Aktiengesellschaft, Ludwigshafen, Germany

[21] Appl. No.: 510,334

[22] Filed: Aug. 2, 1995

Related U.S. Application Data

[63] Continuation of Ser. No. 335,347, Nov. 3, 1994, abandoned.

[30] Foreign Application Priority Data

Nov. 3, 1993 [DE] Germany .......................... 43 37 482.4

[51] Int. Cl.$^6$ .................................................. C08F 265/04
[52] U.S. Cl. .......................... 525/301; 525/285; 525/286; 525/296; 525/303
[58] Field of Search ..................................... 525/285, 286, 525/296, 301, 303

[56] References Cited

FOREIGN PATENT DOCUMENTS

| | | |
|---|---|---|
| 2336517 | 2/1975 | Germany . |
| 2436186 | 3/1975 | Germany . |
| WO88/07555 | 10/1988 | WIPO . |
| WO91/09888 | 7/1991 | WIPO . |
| WO93/25596 | 12/1993 | WIPO . |

*Primary Examiner*—Vasu S. Jagannathan
*Attorney, Agent, or Firm*—Oblon, Spivak, McClelland, Maier & Neudstadt

[57] ABSTRACT

Copolymers crosslinkable by a free radical method are prepared by polymer-analogous reaction of A) a copolymer (A) which is composed of
   a1) from 20 to 85 mol % of a monomer (a1) having the structural element of methacrylic acid and
   a2) from 15 to 80 mol % of another monomer (a2) which undergoes free radical polymerization,
   a3) from 5 to 50 mol % of the total amount of the monomers (a1) and (a2) being monomers (a3) which carry functional groups and whose functional groups are capable of undergoing a condensation or addition reaction, with B) an olefinically unsaturated monomer (B) which carries a functional group which is complementary to that of the monomers (a3), by a process in which the polymer-analogous reaction is carried out at from 90° to 150° C. in an average residence time of from 3 to 20 minutes in highly concentrated solution or in the absence of a solvent. Said copolymers are used as binders for powder coatings.

9 Claims, No Drawings

PREPARATION OF COPOLYMERS CROSSLINKABLE BY A FREE RADICAL METHOD

This application is a Continuation of application Ser. No. 08/335,347, filed on Nov. 3, 1994, now abandoned.

The present invention relates to a novel process for the preparation of copolymers crosslinkable by a free radical method, by polymer-analogous reaction of A) a copolymer (A) which is composed of a1) from 20 to 85 mol % of a monomer (a1) having the structural element of methacrylic acid and a2) from 15 to 80 mol % of another monomer (a2) which undergoes free radical polymerization, a3) from 5 to 50 mol % of the total amount of the monomers (a1) and (a2) being monomers (a3) which carry functional groups and whose functional groups are capable of undergoing a condensation or addition reaction, with B) an olefinically unsaturated monomer (B) which carries a functional group which is complementary to that of the monomers (a3).

U.S. Pat. No. 4,064,161 discloses copolymers which can be used as radiation-curable powder binders. According to the preparation methods described there, they are obtained by anionic copolymerization of alkyl esters of methacrylic acid, a certain proportion of the alkyl groups carrying functional groups, eg. glycidyl groups. In a second step, these copolymers are subject to a polymer-analogous reaction with olefinically unsaturated monomers carrying functional groups, for example acrylic acid, to give copolymers which carry olefinically unsaturated groups as functional groups. The reaction is carried out in solution at 100° C. and in a residence time of several hours in stirred reactors.

DE-A 24 36 186 relates to UV-curable powder binders based on vinyl and acrylate polymers which contain polymerizable unsaturated bonds in the side chains. A copolymer is prepared from predominantly styrene, ethyl acrylate and glycidyl methacrylate by free radical solution polymerization. This epoxy-carrying copolymer is then subjected to a polymer-analogous reaction in about 50% strength solution with acrylic acid at 100° C. in the course of 3 hours.

The conventional processes for the polymer-analogous reaction have the disadvantage that the polymers crosslinkable by a free radical method become discolored or even undergo premature thermal reaction and crosslink, owing to the long residence times at elevated temperatures. Furthermore, they require the use of large amounts of solvents, which have to be either disposed of or worked up again.

It is an object of the present invention to provide a substantially solvent-free process for the polymer-analogous reaction of the copolymers (A) with vinyl compounds (B), in which the reaction mixture is subjected to less thermal stress.

We have found that this object is achieved by a process for the preparation of copolymers crosslinkable by a free radical method, by polymer-analogous reaction of A) a copolymer (A) which is composed of a1) from 20 to 85 mol % of a monomer (a1) having the structural element of methacrylic acid and a2) from 15 to 80 mol % of another monomer (a2) which undergoes free radical polymerization, a3) from 5 to 50 mol % of the total amount of the monomers (a1) and (a2) being monomers (a3) which carry functional groups and whose functional groups are capable of undergoing a condensation or addition reaction, with B) an olefinically unsaturated monomer (B) which carries a functional group which is complementary to that of the monomers (a3), wherein the polymer-analogous reaction is carried out at from 90° to 150° C. in an average residence time of from 3 to 20 minutes in highly concentrated solution or in the absence of a solvent.

The copolymers (A) and the olefinically unsaturated monomers (B), referred to below as vinyl monomers (B), are used as starting materials for the novel process. The copolymers (A), composed of the monomers (a1) to (a3), carry reactive groups via which it can be converted into the novel copolymer in a subsequent polymer-analogous reaction. Monomers (a1) and (a2) which are concomitantly used for this purpose are (monomers (a3)) which, apart from the olefinic double bond, carry additional reactive groups which are inert under the copolymerization conditions. The copolymers (A) are reacted in a second step with olefinically unsaturated monomers (B) which are referred to below as vinyl compounds (B) and additionally have functional groups which react with the reactive groups of the copolymer (A) with formation of a chemical bond.

The novel process relates in particular to the preparation of copolymers crosslinkable by a free radical method and having a number average molecular weight $M_n$ of from 1500 to 10,000, in particular from 1500 to 6000.

The polydispersity $M_w/M_n$, the quotient of the number average and the weight average molecular weights of the copolymers, is a measure of the molecular weight distribution of the copolymers and is ideally 1, although values of less than 4, in particular less than 3.5, are also sufficient in practice.

The stated polydispersity and the stated number average and weight average molecular weights $M_n$ and $M_w$ are based in this case on measurements by gel permeation chromatography, polystyrene being used as the standard. The method is described in Analytiker Taschenbuch, Vol. 4, pages 433 to 442, Berlin 1984.

The molecular weight and the molecular weight distribution of the novel copolymers are determined by the polymerization conditions in the preparation of the copolymers (A).

The formation of copolymers (A) having a low polydispersity and a low molecular weight is particularly promoted if reaction temperatures of from 140° to 210° C., preferably from 150° to 180° C., particularly preferably from 150° to 170° C., and reaction times of from 2 to 90, preferably from 5 to 25, particularly preferably from 10 to 15, minutes are chosen.

If monomers or solvents whose boiling points are below the reaction temperature are present, the reaction should advantageously be carried out under pressure, preferably under the autogenous pressure of the system. However, pressures higher than 30 bar are as a rule unnecessary.

Such polymerization conditions can be maintained in a stirred reactor in which rapid thorough mixing of the starting materials and removal of heat are ensured, and in particular in an annular thin-film reactor having a recycle means, since in this case the exothermic polymerization can be carried out under substantially isothermal conditions, owing to the advantageous ratio of heat exchange area to reaction volume.

Copolymerizations in annular thin-film reactors are described, for example, in DE-A 4 203 277 and DE-A 4 203

278. Said reactors are generally known and may be, for example, in the form of a tube reactor equipped with a rotor and are available, for example, from Buss SMS GmbH Verfahrenstechnik. They are preferably equipped with an apparatus by means of which some of the product can be recycled to the reactor entrance. Other polymerization apparatuses, for example stirred kettles, are also suitable provided that sufficient heat removal is ensured.

The polymerization can be carried out in the absence of a solvent, but solution polymerization is generally preferable, owing to the low viscosity of the resulting polymer solutions. The amount of solvents is in general from 0 to 30, preferably from 10 to 25, % by weight, based on the total amount of monomers used.

Suitable solvents are liquids which are inert to the reactants, for example ethers, such as ethylene glycol ether and ethylene diglycol ether, esters, such as butyl acetate, and ketones, such as methyl amyl ketone. Regulatory solvents, such as alkylaromatics, eg. toluene, xylenes and in particular cumenes and m-xylene, and aliphatic alcohols, eg. isopropanol, are particularly advantageously used.

It is generally advisable to limit the conversion to 50–95, preferably 80–90, mol %, since narrower molecular weight distributions are achieved in this manner. Unconverted monomers and volatile oligomers and the solvent are advantageously recycled for the polymerization after conventional separation from the polymer by distillation.

Particularly suitable polymerization initiators are compounds which form free radicals and whose decomposition temperature is from 140° to 200° C., for example di-tert-butyl peroxide and dibenzoyl peroxide.

The amount of initiators is preferably from 0.5 to 10, particularly preferably from 1 to 5, mol % of the total amount of the monomers used.

Regarding the composition of the copolymers (a), it should be emphasized that, independently of the nature of the remaining moiety, the proportion of the monomers (a1) having the structural element

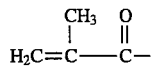

of methacrylic acid is important, and that in principle the type of monomer (a1) or (a2) to which the monomers (a3) having the functional groups belong plays no role. Monomer type (a1) thus includes monomers having nonreactive radicals and those of type (a3). Below, the first-mentioned monomers are initially described, followed by the monomers (a3) having the functional groups.

Examples of monomers (a1) are primarily the $C_1$–$C_{12}$-alkyl esters of methacrylic acid, for example ethyl methacrylate, 2-ethylhexyl methacrylate and n-butyl methacrylate and in particular methyl methacrylate.

Methoxyethyl methacrylate, cyclohexyl methacrylate and benzyl methacrylate are also suitable.

Suitable monomers (a2) are in principle all monomers capable of undergoing free radical polymerization. The alkyl esters of acrylic acid are particularly important. Examples of further suitable monomers of this type are isobutyl, n-butyl and tert-butyl acrylate. In addition to styrene and 1-methylstyrene, 4-tert-butyl styrene and 2-chlorostyrene are also particularly suitable.

Examples of further monomers (a2) capable of undergoing free radical polymerization are vinyl ethers of $C_2$–$C_{20}$-fatty acids, especially vinyl acetate and vinyl propionate, vinyl halides, such as vinyl chloride and vinylidene chloride, conjugated dienes, such as butadiene and isoprene, vinyl ethers of $C_1$–$C_{20}$-alkanols, eg. vinyl isobutyl ether, acrylonitrile, methacrylonitrile and $C_1$–$C_{10}$-alkyl esters of crotonic acid and of maleic acid. Hetero-cyclic vinyl compounds, such as 2-vinylpyridine and n-vinylpyrrolidone, are also suitable.

The monomers (a3), which may belong to either of the classes (a1) and (a2), carry functional groups by means of which the desired functionalization of the copolymers (A) to give the novel copolymer may be effected in a condensation or addition reaction with a vinyl compound (B) carrying a complementary group. Such functional groups are, for example, hydroxyl, carboxamido, amino, carbonyl as an aldehyde or ketone function, isocyanate and especially carboxyl and epoxy.

Corresponding monomers are primarily the relatively cheap compounds 2-hydroxyethyl acrylate and methacrylate, allyl alcohol, 2-aminoethyl acrylate and methacrylate, acrolein, methacrolein and vinyl ethyl ketone, acrylamide and methacrylamide, vinyl isocyanate, methacryloyl isocyanate, dimethyl-3-isopropenylbenzyl isocyanate (TMI) and 4-isocyanatostyrene and especially acrylic acid, methacrylic acid, crotonic acid, maleic acid and their anhydrides as well as glycidyl acrylate and methacrylate.

The polymers (A) are composed of from 20 to 85, preferably from 40 to 85, particularly preferably from 60 to 85, mol % of one or more of the monomers (a1) and from 15 to 80, preferably from 15 to 60, particularly preferably from 15 to 40, mol % of one or more of the monomers (a2).

The proportion of the total amount of the monomers (a1) and (a2) which comprises one or more of the monomers (a3) is from 5 to 50, preferably from 15 to 40, particularly preferably from 20 to 35, mol %.

At conversions of less than 100%, the desired composition of the polymer (A) rarely corresponds to that of the monomer mixture used, because the monomers polymerize at different rates. In such cases, it is necessary to adapt the amount of the particular monomers in the monomer mixture according to their reaction rate. This adaptation may be effected, for example, by analyzing the composition of the unconverted monomer mixture distilled off and thus obtaining information about the composition of the copolymer (A). For example, it is in principle necessary to choose a relatively high proportion of the methacrylic acid derivatives and to reduce the proportion of the other monomers.

Preferably, the copolymers (A) are freed from the solvent and from excess monomers by distillation after the preparation of said copolymers, and the remaining small amounts of residual monomers and volatile oligomers are removed at reduced pressure or by passing nitrogen through the melt.

Owing to the high glass transition temperatures of the polymers and the high boiling points of some of the monomers, a continuously operated thin-film evaporator which is connected in series and in which the copolymer is devolatilized, preferably at from 180° to 220° C. above the polymerization temperature, is particularly suitable for this purpose.

In the novel process, the polymers (A) are derivatized in a polymer-analogous reaction to give the copolymers crosslinkable by a free radical method. They are reacted with functional vinyl compounds (B) whose functional groups are complementary to those of the polymer. Suitable vinyl monomers (B) carrying such functional groups are the same compounds as the abovementioned monomers (a3). A complementary pair whose functional groups are capable of reacting with one another in a condensation or addition reaction may then be chosen from the group consisting of the vinyl monomers (a3) or (B). One partner is used for producing the polymer in the copolymerization while the other serves as a reactant in the polymer-analogous reaction. Pairs such as methacryloyl isocyanate/hydroxyalkyl methacrylate, hydroxyalkyl methacrylate/methacrylic anhydride and hydroxyalkyl methacrylate/methacryloyl chloride are suitable here. The combination glycidyl methacrylate or glycidyl acrylate with methacrylic acid or acrylic acid is particularly preferred.

A further possibility for obtaining the novel polymers is to hydrolyze some of the ester groups which may be present in the copolymer (A) and then to react the resulting carboxyl groups with glycidyl methacrylates or glycidyl acrylates.

Suitable catalysts are all those which are usually used for accelerating the reaction between the complementary groups. For example, phosphines, such as triphenylphosphine, and amines, such as dimethylbenzylamine, dimethylethanolamine and tributylamine, and tetraalkylammonium halides are suitable for the pair of reactants epoxide/carboxylic acid, and, for example, organotin compounds are suitable for the pair of reactants isocyanate/alcohol.

The ratio of functional groups of polymer (A) to the functional vinyl monomers (B) is preferably from 0.7:1 to 1.3:1, particularly preferably from 0.8:1 to 1.2:1 and very particularly preferably 1:1.

An excess of functional groups in the polymer (A) may serve for modifying the properties of the crosslinked polymer, for example to make it less susceptible to electrostatic charging. Such free groups are in particular carboxyl, hydroxyl and carboxamido.

In order to avoid premature thermal crosslinking, it may be necessary to add from 1 to 5000 ppm, preferably from 1 to 1000 ppm, of inhibitors to the polymers (A) before the polymer-analogous reaction. Examples of suitable inhibitors are phenylthiazines, sterically hindered o-phenols or half-ethers of hydroquinone.

The novel polymer-analogous reaction of the polymers (A) with the complementary monomeric functional vinyl compounds (B) to give the novel polymers is carried out at reaction temperatures of from 70° to 150° C., preferably from 90° to 140° C., particularly preferably from 90° to 130° C., the residence times being from 3 to 20, preferably from 5 to 10, minutes.

The copolymer (A) is used in solution with a solids content of at least 60, preferably from 80 to 90, % by weight, particularly preferably free of volatile components.

Owing to the generally high viscosity of the reaction mixtures and the required short reaction times, the polymer-analogous reactions can be particularly advantageously carried out in an extruder, in particular in a self-purging multi screw extruder.

Suitable multi screw extruders are the multi screw, in particular twin screw, extruders known per se in plastics processing, preferably a 2- or 3-flight, twin-screw, self-purging continuous kneader and compounder. The extruders have at least one devolatilization orifice and, to enable the process to be carried out optimally, are generally heatable in zones. The screws are preferably self-purging and rotate in the same direction, and their design is adapted to the particular working conditions in the individual sections of the extruder.

The choice of the suitable screws or screw elements for an optimum procedure is familiar to a person skilled in the art (cf. Schneckenmaschinen in der Verfahrenstechnik, H. Hermann, Springer Verlag, Berlin, Heidelberg, New York 1972).

The polymer-analogous reaction is preferably carried out in an extruder by a method in which I. in a first zone, the copolymer (A) is introduced in solid form and transported, II. in a second zone, the copolymer (A) is heated to 90°–150° C. and the vinyl compound (B) is added and is mixed homogeneously with the copolymer (A), III. in a third zone, the homogeneous melt is freed from volatile components and IV. the devolatilized melt is then discharged from the extruder.

In the first zone, the copolymer A, in the form of granules, is fed into the extruder, with or without further solid assistants and additives, and is transported into the second zone. The screws in this first zone therefore have a transporting function, the first zone having a length of from 2 to 10 times the screw diameter. To avoid premature agglomeration and adhesion of the material, the procedure in the first zone is preferably carried out below the softening temperature of the copolymer (A).

In the second zone, the polymer (A) is melted and is heated to the reaction temperature. The vinyl compound (B) in liquid form and, if required, further liquid assistants and additives and the inhibitors are added and all components of the mixture are mixed homogeneously with one another. Advantageously, the vinyl compound (B) is mixed with the inhibitors before the addition. The vinyl compound (B) and the further assistants and additives may be melted beforehand or dissolved in an inert solvent. Extruders having screws which are formed so that an optimum mixing and homogenizing effect is obtained are particularly preferred. For example, the conventional continuous kneading and compounding screw elements can be used for this purpose since good transverse mixing is also effected in said elements.

In the third zone, the melt is freed from any solvents present, unconverted vinyl compounds (B) and other low molecular weight volatile components. Devolatilization is effected by applying reduced pressure at the devolatilization orifices present in this part of the extruder. In the devolatilization zone, thorough longitudinal mixing of the melt is simultaneously carried out, for example, by providing the extruder in this zone with screws having a different pitch. The length of the devolatilization zone is in general from 2 to 20 times the screw diameter.

At the end of the devolatilization zone, the homogeneous melt is extruded via a die.

The copolymers are marketable even in this form. In general, they are converted into a ready-to-use composition by dissolution or dispersing.

In conformity with the main field of use as binders for powder coatings, however, the copolymers are preferably dried and are processed in a conventional manner to give powders having a mean particle diameter of from 10 to 100 µm.

If desired, additives, such as pigments, crosslinking catalysts, stabilizers, devolatilization assistants, light stabilizers, dulling agents and leveling agents, are subsequently mixed with the copolymers crosslinkable by a free radical method.

These substances are, however, preferably added during the polymer-analogous reaction itself, provided that they are inert to the copolymers (A) and the vinyl compounds (B).

The conventional photoinitiators, such as benzoin ethers, benzophenones, benzoin phosphine oxides and thioxanthones, are used as crosslinking catalysts.

The novel process is very cost-efficient because the consumption of solvents which have to be worked up or disposed of is comparatively low. In the polymer-analogous reaction of the copolymers (A) with the vinyl compounds (B), the starting compounds and the resulting copolymers crosslinkable by a free radical method are subjected to only a slight thermal load, so that hardly any color-imparting components are formed and there is scarcely any evidence of some of the vinyl groups undergoing thermal reaction in the polymer-analogous reaction.

The process is particularly suitable for the preparation of copolymers crosslinkable by a free radical method and having a low molecular weight and a particularly narrow molecular weight distribution. They can be further processed to give radiation-curable powder coatings which can be readily converted into films even at low temperatures and nevertheless can be stored at relatively high temperatures without agglomeration (blocking resistance).

In practice, film formation and UV irradiation are effected by conventional methods known to a person skilled in the art, at from 70° to 150° C., depending on the field of use, but in most cases at from 90° to 130° C. Polymers whose glass transition ranges $T_G$ are close to the desired processing temperature are chosen for this purpose.

The maximum storage temperatures which have to be noted in the case of the particular polymer powders are as a rule from 40° to 50° C.

The polymers prepared by the novel process can be cured by self-crosslinking or by the use of a co-crosslinking agent. Examples of co-crosslinking agents are compounds which are prepared by condensation of methacrylic or acrylic acid with hydroxyalkylated triaminotriazines. Other preferred co-crosslinking agents are the adducts of triglycidyl isocyanurate and acrylic acid.

The products of the process are used as coating materials for any substrates, such as metal, wood, particle boards or plastics. The compounds are particularly suitable as an unpigmented top coat in the coating of automotive bodywork.

A. PREPARATION OF COPOLYMERS (A)

Example 1a 600 g of isopropanol were initially taken in a 5 l reactor and a mixture of 750 g of glycidyl methacrylate, 330 g of styrene, 486 g of methyl acrylate, 1434 g of methyl methacrylate and 58.3 g of di-tert-butyl peroxide was added continuously in the course of 1 hour at 170° C. A solution of 4 g of di-tert-butyl peroxide in 150 g of isopropanol was then added. Polymerization was carried out for a further 15 minutes, and then stopped by cooling to room temperature. The polymer solution was diluted to one and half times the amount with xylene, filtered and freed from volatile components in a thin-film evaporator at 210° C. and 1 mbar.

1254 g of a copolymer (A/1) which had a glass transition temperature $T_G$ of 42° C., a softening point of 84° C., a number average molecular weight of 1800, a polydispersity of 2.1 and an epoxide content of 1.54 epoxide milliequivalents per g (cf. Ullmanns Encyclopädie der technischen Chemie, Volume 8, 3rd edition of 1957, page 436) were obtained. The solids content was 99.2% and was determined by drying a sample of the copolymer for 20 minutes at 200° C.

Example 2a

A mixture of 600 g of isopropanol, 750 g of glycidyl methacrylate, 320 g of hydroxyethyl acrylate, 390 g of styrene, 1440 g of methyl methacrylate and 55.5 g of di-tert-butyl peroxide was copolymerized and worked up, these steps being carried out as described in Example 1.

The copolymer (A/2) obtained had a glass transition temperature $T_G$ of 42° C., a softening point of 85° C., a number average molecular weight of 1500, a polydispersity of 2.3 and an epoxide content of 1.44 epoxide milliequivalents per g. The solids content was 98.7%.

B. POLYMER-ANALOGOUS REACTION

Example 1b

In a twin-screw extruder (type ZSK from Werner and Pfleiderer) having screws which rotate in the same direction and have a nominal diameter of 30 mm and a length/diameter ratio of 33:1, 2065 g/hour of a mixture consisting of 96.8% by weight of the milled copolymer (A/1), 1.1% by weight of 2,4,6-trimethylbenzoyldiphenylphosphine and 2.1% by weight of triphenylphosphine were reacted with 180 g of acrylic acid which had been stabilized with 100 ppm of phenothiazine, at 130° C. in an average residence time of 7 minutes.

The resulting copolymer crosslinkable by a free radical method had a glass transition temperature $T_G$ of 36° C., a softening point of 71° C., a number average molecular weight of 1900, a polydispersity of 2.5, an epoxide content of 0.14 epoxide milliequivalent per g, an acid number of 3.8 and an iodine number of 24.

Example 2b

This experiment differed from Example 1 in that 2065 g/hour of a mixture consisting of 96.8% by weight of the milled copolymer (A/2), 1.1% by weight of 2,4,6-trimethylbenzoyldiphenylphosphine and 2.1% by weight of triphenylphosphine were subjected to a polymer-analogous reaction with 190 g of acrylic acid.

The resulting copolymer crosslinkable by a free radical method had a glass transition temperature $T_G$ of 17° C., a softening point of 66° C., a number average molecular weight of 1400, a polydispersity of 2.0, an epoxide content of 0.19 epoxide milliequivalent per g, an acid number of 3.5 and an iodine number of 21.

Production of the Powder Coatings

A sieve fraction of a milled copolymer crosslinkable by a free radical method, which fraction had a particle diameter of less than 100 μm, was applied to phosphated steel sheets, heated for 10 minutes (copolymer crosslinkable by a free radical method and prepared according to Example 1b) or 15 minutes (copolymer crosslinkable by a free radical method and prepared according to Example 2b) at 120° C. in a through-circulation drier and then exposed twice to a 120 watt UV lamp from IST. A 50 μm thick acetone-resistant coating was obtained.

We claim:

1. A process for the preparation of a copolymer crosslinkable by a free radical method, comprising:

preparing a copolymer (A) by radically copolymerizing a1) from 20–85 mole % of a monomer (a1) containing a methacryloyl radical of the formula:

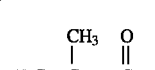

a2) from 15–80 mole % of another monomer (a2) which undergoes free radical polymerization, and a3) from 5–50 mole % of the total amount of monomers (a1) and (a2) being unsaturated monomers (a3) which carry functional groups which are capable of undergoing a condensation or addition reaction; and reacting said copolymer (A) with an olefinically unsaturated monomer (B) which carries a functional group which is complimentary to that of monomers (a3) in a three zone screw extruder, wherein copolymer (A) having a solids content of 80% to 100% by weight of polymer (A) is introduced into the first zone of the extruder, and, as the copolymer flows into the second zone of the extruder, it is heated to 90°–150° C. and homogeneously mixed with monomer (B), the mixed ingredients reacting at a residence time of 3–20 minutes, the reacted melt advancing into a third devolatilization zone, where the melt is freed of volatile components, and said reacted devolatilized mass is discharged from the extruder.

2. A process as claimed in claim 1, wherein the preparation of the copolymer (A) is carried out by free radical mass or solution polymerization of the monomers (a1) to (a3) at from 140° to 210° C. in an average residence time of from 2 to 90 minutes.

3. A process as claimed in claim 1, wherein said extruder is a self-purging multi-group extruder.

4. A process as claimed in claim 1, wherein said monomer (a1) is a $C_{1-12}$-alkyl ester of methacrylic acid.

5. A process as claimed in claim 1, wherein said monomer (a2) is an alkyl ester of acrylic acid, styrene, 1-methylstyrene, a vinyl ether of a $C_{2-20}$ fatty acid, a vinyl halide, a conjugated diene, a vinyl ether, acrylonitrile, methacrylonitrile, a $C_{1-10}$ alkyl ester of crotonic acid or maleic acid or a vinyl heterocyclic compound.

6. A process as claimed in claim 1, wherein monomer (a3) is an unsaturated compound containing a functional group selected from the group consisting of hydroxyl, carboxamido, amino, carbonyl, and isocyanate.

7. A process as claimed in claim 1, wherein the ratio of functional groups of polymer (A) to functional vinyl monomers (B) ranges from 0.7:1 to 1.3:1.

8. A process as claimed in claim 1, wherein, during the extrusion process, at least one member selected from the group consisting of pigments, crosslinking catalysts, stabilizers, dulling agents, levelling agents, devolatilization assistants and light stabilizers is added to said extruder.

9. A process as claimed in claim 1, wherein said solids content of copolymer (A) is 100%.

* * * * *